United States Patent [19]

Benton et al.

[11] 4,415,474
[45] Nov. 15, 1983

[54] CATALYSTS USEFUL FOR THE POLYMERIZATION OF ALPHA-OLEFINS

[75] Inventors: Kenneth C. Benton, Garfield Heights; Brian L. Cmolik, Parma; Raymond J. Weinert, Garfield Heights, all of Ohio

[73] Assignee: The Standard Oil Company, Cleveland, Ohio

[21] Appl. No.: 349,114

[22] Filed: Feb. 16, 1982

[51] Int. Cl.³ ................................................. C08F 4/64
[52] U.S. Cl. .................................. 502/117; 502/126; 502/128; 502/154; 502/169
[58] Field of Search ........... 252/429 A, 429 B, 429 C, 252/431 R

[56] References Cited

U.S. PATENT DOCUMENTS

| | | | |
|---|---|---|---|
| 3,135,809 | 6/1964 | Bosmajian | 252/429 A X |
| 3,141,872 | 7/1964 | Natta et al. | 252/429 A X |
| 3,567,701 | 3/1971 | Keil | 252/429 A X |
| 4,029,864 | 6/1977 | Kurz et al. | 252/429 B X |

*Primary Examiner*—Patrick Garvin
*Attorney, Agent, or Firm*—David P. Yusko; Herbert D. Knudsen; Larry W. Evans

[57] ABSTRACT

This invention relates to novel catalysts and to the use of these catalysts in a process for the polymerization of alpha-olefins. The catalysts comprise a transition metal compound and an organo metallic aluminum activator of the following structure:

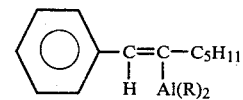

Preferred catalysts comprise titanium compounds and 1-phenyl-2-(dialkyl alumino)-1-heptene.

5 Claims, No Drawings

CATALYSTS USEFUL FOR THE POLYMERIZATION OF ALPHA-OLEFINS

BACKGROUND OF THE INVENTION

The polymerization of alpha-olefins by transition metal complexes, i.e. Ziegler-type catalysts, has been practiced since the 1950's. These transition metal complexes comprise a transition metal compound and an organo metallic activator. Over the years, many combinations of transition metal compounds and organo metallic activators have been used in alpha-olefin polymerization processes. Very few of these combinations have been found to work well in the polymerization process.

The instant invention comprises a novel catalyst containing (1) a transition metal compound, and (2) an organo metallic activator comprising 1-phenyl-2-(dialkyl alumino)-1-heptene. These catalysts are extremely active and exhibit excellent selectivity for heptane insoluble polyolefins.

SUMMARY OF THE INVENTION

This invention relates to a novel Ziegler-type transition metal complex catalyst comprising (1) a compound of a transition metal of Groups IV to VIII, and (2) an organo aluminum activator of the structure:

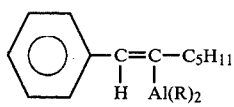

wherein R is a suitable hydrocarbon, preferably a $C_{1-6}$ alkyl and the phenyl group can be either unsubstituted or substituted with 1 to 5 alkyl groups. The preferred catalysts comprise (1) a titanium compound, and (2) 1-phenyl-2-(dialkyl alumino)-1-heptene.

Moreover, it has also been discovered that alpha-olefins can be polymerized by contacting an alpha-olefin with the above-identified catalyst at the appropriate reaction conditions.

DETAILED DESCRIPTION

Transition metal complex catalysts, i.e. Ziegler-type catalysts, in general, are prepared by the reaction of a transition metal compound with an organo metallic activator. These catalysts contain active sites which polymerize alpha-olefins to high molecular weight polymers and which also control the manner of monomer addition. Generally speaking, each new alpha-olefin molecule is incorporated into the polymer chain in a manner identical to that of the preceeding molecule. This leads to regularity in structure and allows the polymer to crystallize.

These Ziegler-type catalysts can be formed by bringing together a transition metal compound in which the transition metal is in a valence state below its normal maximum, for example titanium trichloride, and an organo metallic activator, for example aluminum diethylmonochloride. Many forms of Ziegler-type catalysts have been proposed and, as is well known in the art, there are many transition metal compounds and organo metallic activators which may be used to form these catalysts. Such catalysts may comprise one or more transition metal compound in combination with one or more organo metallic activators.

Any transition metal compound in which the transition metal is present in a valence state below its normal maximum and which can function as an olefin polymerization catalyst may be used in carrying out the present invention. Preferably, transition metal halides, alkyl halides, alkoxides and alkyls may be used in this invention, wherein the transition metal is at least one of zirconium, vanadium, rhodium, hafnium, titanium and chromium. It is generally preferred to use titanium trichloride as the transition metal compound.

The organo metallic activator is normally based on an element selected from Group IA, IIA and IIIA of the Periodic Table and will usually be an aluminum compound. Normally, the aluminum compound is an alkyl aluminum halide or an aluminum trialkyl wherein each alkyl chain contains less than 8 carbon atoms. Examples of suitable aluminum activators include aluminum triethyl, aluminum tri-n-propyl, aluminum tri-isobutyl, aluminum diethylmonochloride and aluminum tri-n-hexyl.

Applicants have discovered that catalysts containing 1-phenyl-1-heptenyl dialkyl aluminum activators show unexpectedly high activity in an alpha-olefin polymerization process. These 1-phenyl-1-heptenyl dialkyl aluminum activators can be represented by the following structure:

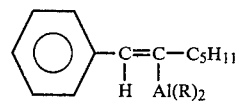

wherein R is a suitable alkyl hydrocarbon and the phenyl group can be either unsubstituted or substituted with 1 to 5 alkyl groups. Preferably, R is a $C_{1-6}$ alkyl. Especially preferred aluminum activators are 1-phenyl-2-(diethyl alumino)-1-heptene and 1-phenyl-2-(diisobutyl alumino)-1-heptene.

These aluminum activators are easily prepared by the addition of a dialkyl aluminum hydride across the carbon-carbon triple bond of a substituted alkyne. This reaction can be performed with the neat reactants or in an inert diluent at temperatures in the range of 30° to 150° C. This reaction must be performed under an inert atmosphere. The dialkyl aluminum hydrides which are suitable for this reaction include dimethyl aluminum hydride, diethyl aluminum hydride, di-n-propyl aluminum hydride, di-i-propyl aluminum hydride, di-n-butyl aluminum hydride, di-i-butyl aluminum hydride and di-s-butyl aluminum hydride. The substituted alkyne useful in this reaction is 1-phenyl-1-heptyne.

These catalysts may be treated with a wide range of electron donors, including ethers, amides, esters, alkyl halides, halogens, interhalogen compounds, phosphines, phosphonitriles, alcohols, thiols and thioethers which enhance the catalyst activity or stereoregularity. These additives are well known in the art.

The activated catalyst can be homogeneous or heterogeneous, supported or unsupported. This catalyst can be used to polymerize alpha-olefins in solution, slurry in an inert diluent, bulk monomer or gas phase under normal alpha-olefin polymerization conditions. The polymerization can be performed at temperatures of from 25° to 200° C., preferably 50° to 130° C. and at pressures from 1 to 3,000 atmospheres, preferably 1 to 300 atmospheres. Suitable alpha-olefin reactants useful for this polymerization process include ethylene, propylene, butene-1, pentene-1, hexene-1 and 4-methyl pentene-1.

The activator can be added to the transition metal compound either before or after exposure of the transition metal compound to the monomer. The activator can be added batchwise, intermittantly or continuously throughout the polymerization. The activator is used in the proportion of 1:1 to 300:1, preferably 1:1 to 50:1, atom ratio of aluminum in the activator to transition metal.

The recovery and purification of the polymeric product are performed by well known methods.

SPECIFIC EXAMPLES

The following examples illustrate the use of the catalysts of this invention. Unless otherwise indicated, all parts and percentages are by weight.

Example A: Preparation of Aluminum Alkyl Activators

A dry, nitrogen purged 7 oz. Crown cap bottle is charged with 5.0 g. (0.0268 moles) of 1-phenyl-1-octyne and 21.6 ml. of a 25 weight percent n-heptane solution of di-i-butyl aluminum hydride (0.0268 moles). The bottle is agitated at 70° C. in a constant temperature bath. After 2 hours the reaction is essentially complete. An essentially quantitative yield of 1-phenyl-2-(di-i-butyl alumino)-1-octene is obtained. The concentration is calculated to be 0.98 millimoles per mililiter.

Examples 1 through 8

These examples illustrate the polymerization of propylene by a conventional alpha-titanium trichloride.⅓ aluminum chloride activated by several different aluminum alkyl activators.

A dry, nitrogen purged 7 oz. Crown cap bottle is charged with 75 ml. of purified n-heptane, 0.10 millimoles of alpha-titanium trichloride.⅓ aluminum chloride (0.075 mg-atom Ti) and 10.0 gms. (0.238 moles) of propylene. A quantity of an aluminum alkyl activator solution, prepared as shown in Example A, containing 0.225 mg-atom of aluminum (Al/Ti equals 3.0) is injected into the bottle, which is then agitated in a constant temperature water bath at 70° C. for 30 minutes. The excess propylene is then vented and the catalyst is destroyed by injecting 2 to 3 ml. of methanol into the bottle. The polypropylene slurry is poured into 500 ml. of methanol acidified with hydrochloric acid, stirred for 15 to 30 minutes and the polymer is recovered by vacuum filtration. The polypropylene is dried for 24 hours at 60° C. under reduced pressure. The activity is calculated from the amount of polymer recovered. The n-heptane insoluble fraction is determined by extracting the product with n-heptane for 24 hours in a standard Soxhlet apparatus.

The results obtained for several 1-aryl-2-(dialkyl alumino)-1-alkene. activators are shown in Table I. It can be seen that the highest activity catalysts used 1-phenyl-2-(dialkyl alumino)-1-heptene activators.

TABLE I

Polymerization of Propylene

| Exam | Activator | Conv (%) | Activity (gPP/g-Ti-hr) | n-Heptane Insoluble Fraction (%) |
|---|---|---|---|---|
| 1 | 1-phenyl-2-(diethyl alumino)-1-ethene | 37.7 | 1,570 | 64.8 |
| 2 | 1-phenyl-2-(diethyl alumino)-1-butene | 69.2 | 2,890 | 58.3 |
| 3 | 1-phenyl-2-(diethyl alumino)-1-heptene | 84.5 | 3,530 | 64.3 |
| 4 | 1-phenyl-2-(diethyl alumino)-1-octene | 84.2 | 3,520 | 66.7 |
| 5 | 1-phenyl-2-(di-i-butyl alumino)-1-ethene | 57.0 | 2,380 | 50.0 |
| 6 | 1-phenyl-2-(di-i-butyl alumino)-1-butene | 93.7 | 3,910 | 46.5 |
| 7 | 1-phenyl-2-(di-i-butyl alumino)-1-heptene | 96.1 | 4,010 | 54.5 |
| 8 | 1-phenyl-2-(di-i-butyl alumino)-1-octene | 95.0 | 3,970 | 43.1 |

Examples 9 through 14

These examples demonstrate the use of various 1-phenyl-2-(dialkyl alumino)-1-heptene compounds as activators for high activity magnesium chloride supported catalysts in the polymerization of propylene.

The polymerizations were performed in the same manner as described in Example 1, except that the amount of catalyst employed corresponded to $6.42 \times 10^{-3}$ mg-atom of titanium, the aluminum/titanium ratio was 20 and the polymerization was allowed to proceed for 5 minutes only.

Table II compares the results obtained with the 1-phenyl-2-(dialkyl alumino)-1-heptene activators with several conventional activators. It is seen that the use of 1-phenyl-2-(dialkyl alumino)-1-heptene activators results in significantly higher catalyst activity than is obtained with the conventional aluminum activators.

TABLE II

Polymerization of Propylene

| Exam | Activator | Conv (%) | Activity (gPP/g-Ti-hr) | n-Heptane Insoluble Fraction (%) |
|---|---|---|---|---|
| 9 | 1-phenyl-2-(diethyl alumino)-1-heptene | 32.8 | 128,000 | 52.7 |
| 10 | 1-phenyl-2-(di-i-butyl alumino)-1-heptene | 34.5 | 135,000 | 38.6 |
| 11 | Diethyl aluminum hydride | 15.2 | 59,300 | 71.1 |
| 12 | Triethyl aluminum | 21.0 | 81,900 | 64.3 |
| 13 | Di-i-butyl aluminum hydride | 5.7 | 22,200 | 93.0 |
| 14 | Tri-i-butyl aluminum | 2.8 | 10,900 | 96.4 |

Example 15

This example illustrates the use of an electron donor compound with 1-phenyl-2-(diethyl alumino)-1-heptene for the activation of a high activity magnesium chloride supported catalyst in the polymerization of propylene.

The polymerization was conducted generally as described in Example 9, except for the following changes: 50 ml. of n-heptane were used as the solvent, a quantity of a magnesium chloride supported catalyst corresponding to $6.68 \times 10^{-3}$ mg-atom of titanium was employed, the activator consisted of a 3:1 molar ratio of 1-phenyl-2-(diethyl alumino)-1-heptene:methyl p-toluate, and the aluminum/titanium ratio was 10. The conversion was 37.6%, the activity was 141,000 g PP/g Ti-hr, and the n-heptane insoluble fraction was 90.4%.

It is seen that the 1-phenyl-2-(diethyl alumino)-1-heptene can be modified with a Lewis base so that highly isotactic polypropylene is obtained.

Examples 16 through 23

These examples illustrate various aluminum activators used with a magnesium chloride supported titanium compound for the polymerization of propylene. The polymerizations were performed as described in Example 9. The results are shown in Table III. It is seen that the chain length of the 1-phenyl-2-(dialkyl alumino)-1-alkene has a remarkable effect on the activity obtained with magnesium chloride supported catalysts, the highest activity being obtained with the 1-phenyl-2-(dialkyl alumino)-1-heptene activator. It is also seen that the polypropylene isotactic index is affected by both the size of the 1-phenyl-1-alkenyl radical and the two saturated alkyl radicals of the unsymmetrical aluminum alkyls.

TABLE III

Polymerization of Propylene

| Exam | Activator | Conv (%) | Activity (gPP/g-Ti-hr) | n-Heptane Insoluble Fraction (%) |
|---|---|---|---|---|
| 16 | 1-phenyl-2-(diethyl alumino)-1-ethene | 0.3 | 1,170 | —[1] |
| 17 | 1-phenyl-2-(diethyl alumino)-1-butene | 3.8 | 14,800 | 65.8 |
| 18 | 1-phenyl-2-(diethyl alumino)-1-heptene | 32.8 | 128,000 | 52.7 |
| 19 | 1-phenyl-2-(diethyl alumino)-1-octene | 4.3 | 16,800 | 95.3 |
| 20 | 1-phenyl-2-(di-i-butyl alumino)-1-ethene | 0.2 | 780 | —[1] |
| 21 | 1-phenyl-2-(di-i-butyl alumino)-1-butene | 3.3 | 12,900 | 97.0 |
| 22 | 1-phenyl-2-(di-i-butyl alumino)-1-heptene | 34.5 | 135,000 | 38.6 |
| 23 | 1-phenyl-2-(di-i-butyl alumino)-1-octene | 4.1 | 16,000 | 75.0 |

[1]Not determined.

Although only a few embodiments of the present invention have been specifically described, it should be appreciated that many additions and modifications can be made without departing from the spirit and scope of the invention. These and all other modifications are intended to be included within the scope of the present invention, which is to be limited only by the following claims.

We claim:

1. A Ziegler-type transition metal complex catalyst comprising
   (1) a transition metal compound; and
   (2) a 1-phenyl-2-(dialkyl alumino)-1-heptene activator.

2. The catalyst of claim 1 wherein the transition metal is selected from the group consisting of zirconium, vanadium, rhodium, hafnium, titanium and chromium.

3. The catalyst of claim 2 wherein the transition metal is titanium.

4. The catalyst of claim 1 wherein the transition metal complex is titanium trichloride.

5. The catalyst of claim 1 wherein the activator is selected from the group consisting of 1-phenyl-2-(diethyl alumino)-1-heptene and 1-phenyl-2-(di-i-butyl alumino)-1-heptene.

* * * * *